April 12, 1960

J. O. CROUSE 2,932,215

CONTROL DEVICE

Filed Dec. 18, 1957

INVENTOR.
John O. Crouse
BY
Attorneys

April 12, 1960     J. O. CROUSE     2,932,215
CONTROL DEVICE

Filed Dec. 18, 1957                           2 Sheets-Sheet 2

INVENTOR.
John O. Crouse
BY
Attorneys

United States Patent Office 2,932,215
Patented Apr. 12, 1960

2,932,215

CONTROL DEVICE

John O. Crouse, Mansfield, Ohio, assignor to Richland Auto Parts Company, Mansfield, Ohio, a corporation of Ohio Application December 18, 1957, Serial No. 703,635

5 Claims. (Cl. 74—502)

My invention relates to control devices and particularly to such devices generally referred to as "Bowden controllers" which are adapted to remotely actuate a lever, plunger, or similar element from a handle conveniently mounted on an instrument panel, dashboard, or the like. The present invention is an improvement over the type of control device as set forth in United States Letters Patent No. 2,319,041 to Oliver P. Crouse issued May 11, 1943. The device comprises, generally, a cable encased in a flexible housing, said cable being connected at one end thereof to a longitudinally adjustable rod mounted in a dashboard and having the opposite end thereof secured to a controlling element situated remotely from said adjustable rod.

A particular and important feature of such devices is that means are provided for locking the adjustable rod against longitudinal displacement due to vibration, shock, or tension on the control cable. An example of an application of this device would be in controlling a braking mechanism wherein locking of the brake in an "on" position is essential to safety.

It is, therefore, an object of my invention to provide an improved remote control device wherein the longitudinal movement of a control rod effects a corresponding movement at a control point remote from said control rod.

Another object of my invention is to provide, in a control device of the above type, improved means whereby the control rod can be locked in any longitudinally adjusted position.

Still another object of my invention is to provide an improved control device as set forth above wherein the replacing of worn parts is greatly facilitated.

Yet another object of my invention is to provide such a device which is economic to manufacture and highly durable in use.

A still further object of my invention is to provide a control device embodying all of the aforesaid features which is easy to install, positive and reliable in function, and convenient to operate.

Other objects of my invention and the invention itself will become more apparent by referring to the following description and the appended drawings.

Figure 1:
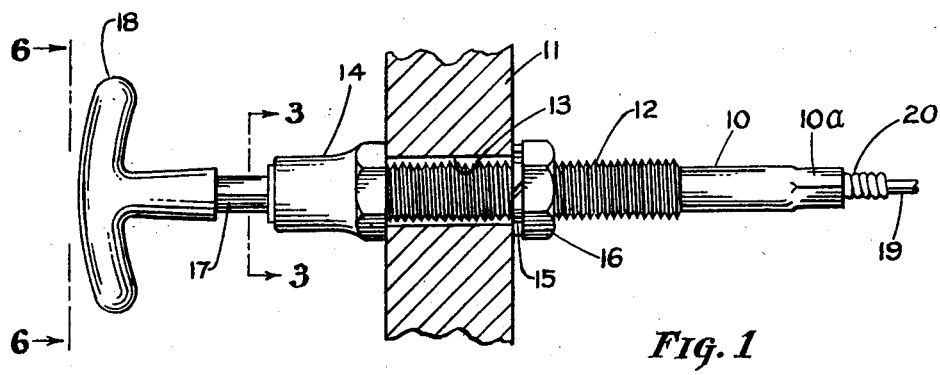
Fig. 1 is a plan view of the control device of my invention.

Referring now to the drawings, in all of which like parts are designated by like reference characters, and particularly to Fig. 1, at 10 I show a tubular support mounted in an instrument panel 11. The support 10 has a substantial threaded portion 12 projecting through an aperture 13 in the panel 11, said support being secured therein by means of an internally threaded sleeve 14 at the front of said panel and a washer 15 and nut 16 at the rear of said panel. The sleeve 14 is coaxial with and threaded-fitted to the forwardly directed end of the support 10 and projects forwardly therefrom.

A noncircular control rod 17 having flat outer surfaces 17a projects coaxially into the sleeve 14 and the support 10, the forward end of said control rod extending beyond said sleeve 14 having a T-shaped handle 18 secured thereto. The rearwardly directed end of the control rod 17 terminates within the tubular support 10 and has attached thereto a control cable 19 encased in a flexible housing 20. The housing 20 is telescopically interfitted a short distance within the rearwardly directed end of the support 10 and is secured thereto preferably by swaging as indicated at 10a. The opposite end of the cable 19 is secured to a control point remote from the instrument panel 11 which is not herein illustrated.

Figure 2:
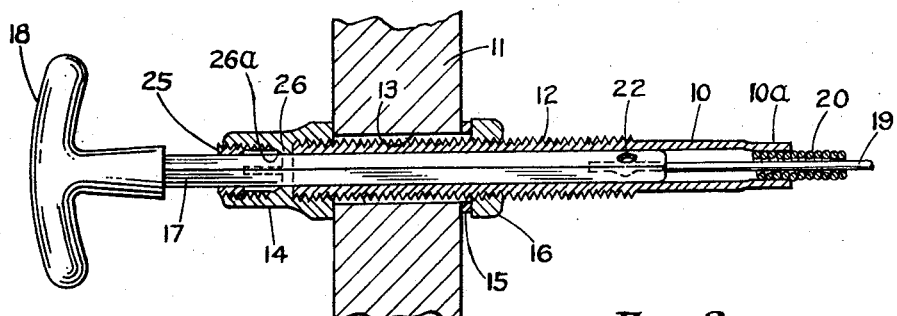
Fig. 2 is a sectional view of the device of Fig. 1.
Figure 3:
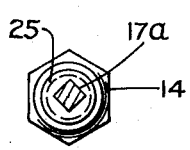
Fig. 3 is a view taken along the line 3—3 of Fig. 1.
Figure 8:
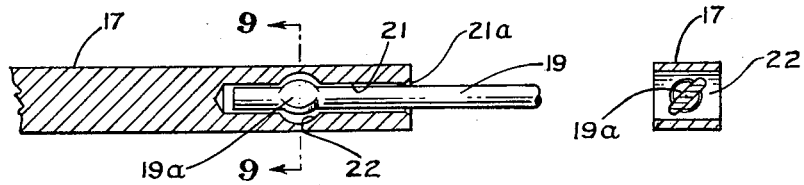
Fig. 8 is a longitudinal sectional view of a portion of the control device showing the connection with the control cable.
Figure 9:
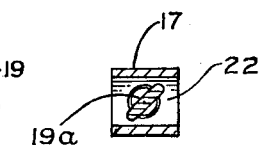
Fig. 9 is a sectional view taken along the line 9—9 of Fig. 8.

As best shown in Figs. 2, 8 and 9, the cable 19 is rotatably mounted within a longitudinal socket 21 in the rearwardly disposed end of the control rod 17. A transverse aperture 22 in the control rod 17 of relatively larger diameter than the socket 21 intersects said socket a short distance from its mouth 21a whereby a suitable tool is inserted to flatten the cable 19 forming a widened button-shaped portion 19a therein. The portion 19a is of such dimension as to prevent removal of the cable 19 from the socket 21 while permitting rotation of said cable within said socket.

Referring now particularly to Fig. 2, the locking mechanism of my device is contained by the sleeve 14 and comprises, primarily, a collet type gripping element 25 thread fitted within the forwardly directed end of the sleeve 14 and adapted to coact with a medially positioned circumferentially reduced beveled portion 26, said beveled portion providing a seat 26a in said sleeve.

Figure 4:
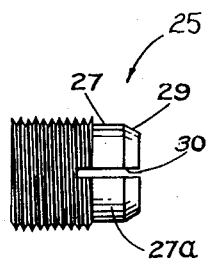
Fig. 4 is a side plan view of the gripping element of my device.
Figure 5:
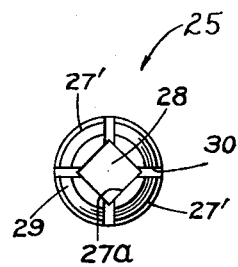
Fig. 5 is an end view of the gripping element of Fig. 4.

The gripping element 25 is best shown in Figs. 4 and 5 and comprises an externally threaded collet having a circumferentially reduced nonthreaded portion 27 and a noncircular bore 28. The nonthreaded portion 27 has a taper 29 at the end thereof adapted to complementarily interfit the seat 26a of the sleeve 14. By means of the noncircular bore 28, the gripping element 25 is telescoped over the noncircular control rod 17, said bore and said rod being cross-sectionally complementarily shaped to slidably interfit. By means of longitudinal slots 30 in the nonthreaded portion 27, the gripping element 25 is provided with a plurality of longitudinally projecting finger portions 27' having flat inner surfaces 27a slidably contiguous with the flat outer surfaces 17a of the control rod 17.

Figure 6:
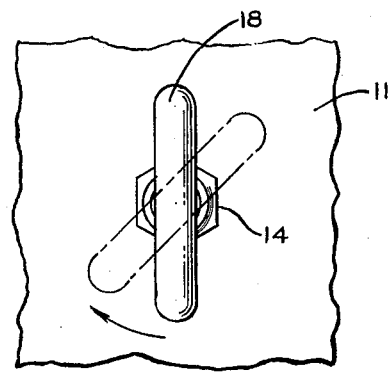
Fig. 6 is an end view of the control device taken from the direction as indicated by the line 6—6 of Fig. 1.
Figure 7:
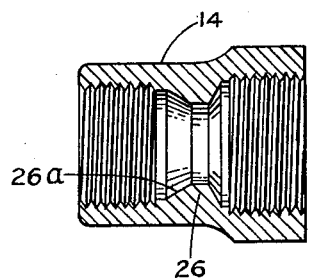
Fig. 7 is a longitudinal section of the threaded sleeve shown in Figs. 1 and 2.

From the foregoing description, it will be understood that the control rod 17 is freely rotatable relative to the cable 19 within the support 10 and that it is also freely rotatable within the sleeve 14. It will be further understood that the gripping element 25 is rotationally interlocked with said control rod by means of the noncircular aperture 28. When, therefore, the control rod 17 is rotated in a clockwise direction as shown in dotted lines, Fig. 6, the gripping element 25 is moved longitudinally inwardly to bring the tapered surface 29 into tighter engagement with the seat 26a in the sleeve 14. The finger portions 27' are thereby cammed radially inwardly, and the flat inner surfaces 27a frictionally engage the flat outer surfaces 17a.

To operate the control device of my invention, the operator grasps the handle 18 by which the control rod 17 is axially rotated. To release said control rod from frictional engagement with the gripping element 25, the handle 18 is rotated slightly in a counter-clockwise direction. After the desired longitudinal adjustment of the control rod 17 has been made, the handle 18 is rotated in a clockwise direction to lock said control rod in place. Only a moderate amount of pressure is required on the handle 18 to obtain a firm, positive hold on the control rod.

The present invention provides many advantages over prior art devices with which I am familiar. By making the sleeve 14 and the gripping element 25 into a unified locking structure, the replacement of parts which receive most of the wear is greatly facilitated. The present device also allows more flexibility in the choice of materials for manufacturing the different parts. It is possible, for example, that the contacting parts, i.e. the collet and seat, could be more advantageously made of materials possessing different degrees of hardness, resilience, etc.

Additionally, by placing the seat in the sleeve instead of the support, the size of the seat and the coacting gripping element is not dependent upon the size of said support. This also results in a more flexible choice of sizes for the control rods.

It is also obvious that when the seat is in the support, said seat is more liable to be damaged during handling and installation. A "nicked" or scored collet seat adversely affects the operation of this type of device. By placing the seat well inside the sleeve, it is protected from such contingencies.

Furthermore, a very important feature of the present invention is that in use the tightening of the gripping element tends to automatically tighten the sleeve upon the support. This is due to the fact that the gripping element frictionally contacts the sleeve at the seat thereof and thereby transfers torque to the said sleeve. When the gripping device is loosened, the opposite effect is not accomplished, i.e. the sleeve is not loosened, because the contacting area between the support and sleeve is greater than between the finger portions and the sleeve. Experiments have shown that even when the sleeve is initially loose upon the support, the rotation of the gripping element to lock the control rod will also firmly tighten the sleeve upon the support, and when the gripping element is rotated in the reverse direction, said sleeve remains tight. In the present device it is, therefore, impossible for the sleeve to work loose from the support during use since each actuation of the gripping element positively tightens the said sleeve. This feature completely overcomes a distinct disadvantage found in prior control devices with which I am familiar.

It will be understood that many departures from the details of my invention as it is herein described and illustrated may be made, such as changes in size and dimension, without, however, departing from the spirit of my invention on the scope of the appended claims.

What I claim is:

1. A control device comprising a tubular support, a sleeve mounted upon one end of said tubular support having a free end extending therefrom, said sleeve having a beveled seat therein, a gripping element thread fitted within the free end of said sleeve having a polygonal shaped bore, said gripping element having a plurality of longitudinally extending fingers tapered at the ends thereof to complementarily interfit said seat, said fingers having flat inner surfaces, a polygonal shaped control rod slidably interfitted with said gripping element, said control rod having flat outer surfaces corresponding to the flat inner surfaces of said gripping element and contiguous therewith, means for rotating said control rod and effecting longitudinal movement thereof, said fingers adapted to be radially inwardly cammed by said seat when said means is rotated to move the gripping element longitudinally in the direction of said seat.

2. A control device comprising a tubular support, a sleeve thread fitted upon one end of said support having a free end extending longitudinally therefrom, said sleeve having a beveled seat therein, a gripping element thread fitted within the free end of said sleeve having a polygonal shaped bore, said gripping element having a plurality of longitudinally extending fingers tapered at the ends thereof to complementarily interfit said seat, said fingers having flat inner surfaces, a polygonal shaped control rod slidably interfitted with said gripping element, said control rod having flat outer surfaces corresponding to the flat inner surfaces of said gripping element and contiguous therewith, a handle for rotating said control rod and said gripping element, said fingers adapted to be radially inwardly cammed by said seat when said handle is rotated to move the gripping element longitudinally in the direction of said seat.

3. A control device comprising a tubular support, a sleeve thread fitted upon one end of said support having a free end extending longitudinally therefrom, said sleeve having an internal, circumferentially reduced portion abutting said support, said reduced portion having a beveled seat therein, a gripping element thread fitted within the free end of said sleeve having a polygonal shaped bore, said gripping element having a plurality of longitudinally extending fingers tapered at the ends thereof to complementarily interfit said seat, said fingers having flat inner surfaces, a polygonal shaped control rod slidably interfitted with said gripping element, said control rod having flat outer surfaces contiguous with the flat inner surfaces of said gripping element, a handle for rotating said cotnrol rod and said gripping element whereby upon rotation of said handle in one direction, said fingers are radially inwardly cammed by said seat to frictionally engage said control rod and upon rotation of said handle in the opposite direction, said fingers are released from frictional engagement with said control rod.

4. A control device for mounting in a panel for actuating a remotely situated control element, said control device comprising a tubular support projecting through an aperture in said panel, a sleeve thread fitted upon one end of said support and abutting said panel, securing means associated with said support and adapted to cooperate with said sleeve to clamp said device to said panel, said sleeve having a free end extending longitudinally from said support, said sleeve having an internal, circumferentially reduced portion abutting said support, said reduced portion having a beveled seat therein, a gripping element thread fitted within the free end of said sleeve having a polygonal shaped bore, said gripping element having a plurality of longitudinally extending fingers tapered at the ends thereof to complementarily interfit said seat, said fingers having flat inner surfaces, a polygonal shaped control rod slidably interfitted with said gripping element, said control rod having flat outer surfaces contiguous with the flat inner surfaces of said gripping element, a control cable axially rotatably attached to said control rod within said support, a handle for rotating said control rod and said gripping element whereby upon rotation of said handle in one direction, said fingers are radially inwardly cammed by said seat to frictionally engage said control rod and upon rotation of said handle in the opposite direction, said fingers are released from frictional engagement with said control rod.

5. A control device comprising a tubular support, a sleeve mounted upon one end of said tubular support having a free end extending therefrom, said sleeve having a beveled seat therein, a gripping element thread fitted within the free end of said sleeve having a longitudinal bore therethrough, said gripping element having a plurality of longitudinally extending fingers tapered at the ends thereof to complementarily interfit said seat, a control rod slidably interfitted with said gripping element, the cross sectional contour of said rod and said bore being such that rotation of said rod necessarily causes rotation of said gripping element, said fingers of said gripping element having longitudinally straight inner surfaces, said control rod having longitudinally straight outer surfaces corresponding to said straight inner surfaces of said gripping element and contiguous therewith, means for rotating said control rod and effecting longitudinal movement thereof, said fingers adapted to be radially inwardly cammed by said seat when said means is rotated to move the gripping element longitudinally in the direction of said seat.

References Cited in the file of this patent

UNITED STATES PATENTS

| | | |
|---|---|---|
| 1,601,976 | Mayer | Oct. 5, 1926 |
| 1,631,277 | Long | June 7, 1927 |
| 2,112,722 | Weber | Mar. 29, 1938 |
| 2,319,041 | Crouse | May 11, 1943 |

FOREIGN PATENTS

| | | |
|---|---|---|
| 837,156 | France | Nov. 3, 1938 |